(12) United States Patent
Hadar

(10) Patent No.: US 6,674,963 B2
(45) Date of Patent: Jan. 6, 2004

(54) ELECTRICAL HEATING APPARATUS

(75) Inventor: Yoram Hadar, Natania (IL)

(73) Assignee: Atmor Industries (1973) Ltd., Bnei-Brak (IL)

( * ) Notice: Subject to any disclaimer, the term of this patent is extended or adjusted under 35 U.S.C. 154(b) by 0 days.

(21) Appl. No.: 10/220,892

(22) PCT Filed: Mar. 8, 2001

(86) PCT No.: PCT/IL01/00220

§ 371 (c)(1),
(2), (4) Date: Sep. 6, 2002

(87) PCT Pub. No.: WO01/67815

PCT Pub. Date: Sep. 13, 2001

(65) Prior Publication Data

US 2003/0206733 A1 Nov. 6, 2003

(30) Foreign Application Priority Data

Mar. 8, 2000 (IL) ................................................ 134946

(51) Int. Cl.⁷ ................................................ F24H 1/10
(52) U.S. Cl. ...................................... 392/480; 392/475
(58) Field of Search ................................. 392/480, 465, 392/466, 474, 475, 485

(56) References Cited

U.S. PATENT DOCUMENTS

| 2,791,671 A | 5/1957 | Price |
| 4,558,207 A | 12/1985 | Litterst |
| 5,277,152 A | 1/1994 | Liao |
| 5,437,003 A | 7/1995 | Blanco |
| 6,175,689 B1 | 1/2001 | Blanco, Jr. |

Primary Examiner—Thor Campbell
(74) Attorney, Agent, or Firm—G. E. Ehrlich (1995) Ltd.

(57) ABSTRACT

Electrical heating apparatus includes an electrical heater in which the inlet conduit for inletting cold water to the electrical heater and/or the outlet conduit for outletting hot water thereto from the electrical heater is integrally formed with a pressure-responsive device which senses the flow rate to or through the electrical heater to control the energization of the electrical heater. The apparatus also includes a regulating valve constituted of a membrane and a stem having a head of convex configuration facing the membrane but normally spaced therefrom to define a flow-control passageway which creates differential pressures acting on the membrane tending to deform the membrane such as to maintain a relatively constant flow rate through the flow control passageway despite variations in water inlet pressure.

29 Claims, 24 Drawing Sheets

ELECTRICAL HEATING APPARATUS

RELATED PATENT APPLICATIONS

This application is a National Phase Entry of PCT/IL01/00220 filed Mar. 8, 2001, which claims priority from Israel Patent Application Serial No. 134946 filed Mar. 8, 2000.

FIELD AND BACKGROUND OF THE INVENTION

The present invention relates to electrical heating apparatus, and particularly to such apparatus for automatically heating water passing through the apparatus from a cold water supply pipe to a hot water delivery pipe.

Electrical heating apparatus of the foregoing type is widely used for providing instantaneous hot water from a cold water supply, such as for preparing a hot beverage, taking a hot shower, washing dishes, etc. Such apparatus generally includes a housing having an electrical heater, one or more electrical switches controlling the electrical heater, an inlet conduit connectable between the water supply pipe and the electrical heater for inletting cold water to the electrical heater, a pressure-responsive device cooperable with the electrical switches to control the electrical heater, a heater coupling for inletting the water into the electrical heater, and an outlet conduit connectable between the electrical heater and the water delivery pipe for outletting hot water from the electrical heater to the hot water delivery pipe. Some devices further include a control valve for controlling the water flow into the electrical heater. Generally, some or all of the foregoing components at the inlet side of the electrical heater are manufactured as separate units and assembled into the electrical heating apparatus at the time of its installation.

Producing the foregoing components as separate units increases the time and cost of installing such an electrical heating apparatus, as well as the time for disassembling the apparatus for purposes of maintenance and/or repair.

OBJECTS AND BRIEF SUMMARY OF THE INVENTION

An object of the present invention is to provide electrical heating apparatus which enables faster installation, as well as more convenient maintenance and repair, of the apparatus.

According to one aspect of the present invention, there is provided electrical heating apparatus for automatically heating water passing therethrough from a cold water supply pipe to a hot water delivery pipe, comprising: a water heater housing including an electrical heater therein, an inlet coupling, and an outlet coupling; an electrical control device controlling said electrical heater; an inlet conduit connectable between the water supply pipe and the inlet coupling of the electrical heater housing for inletting cold water; an outlet conduit connectable between the outlet coupling of the water heater housing and the water delivery pipe for outletting hot water thereto; and a pressure-responsive device cooperable with said electrical control device to control the electrical heater; characterized in that said pressure-responsive device is connected to one of said conduits in parallel to said electrical heater housing, and in that said pressure-responsive device includes an inlet integrally formed with said one conduit and the respective coupling of water heater housing.

Preferably, the conduit integrally formed with the pressure-responsive device inlet is the inlet conduit connectable between the water supply pipe and the inlet coupling of the electrical heater housing. Also preferably, the inlet conduit is also integrally formed with the inlet coupling.

Such a construction greatly facilitates installation, maintenance and repair of the apparatus.

A number of embodiments of the invention are described below for purposes of example.

In some of the described embodiments, the apparatus further comprises a control valve for controlling the water flow into the electrical heater; the control valve including a housing having an inlet also integrally formed with the inlet conduit and with at least part of the control valve housing, thereby further facilitating installation, maintenance and repair of the apparatus. Several embodiments are described below in which the control valve is a manually presettable valve, particularly a ball valve having a ball rotatable within the control valve housing and formed with a variable-depth passageway for controlling the water flow therethrough to the electrical heater. In other described embodiments, the control valve is a regulator valve automatically regulating the water flow therethrough to have a relatively constant rate despite variations in the water inlet pressure.

However, embodiments are also described below wherein no control valve is provided within the electrical heating apparatus itself in which case, the water flow would be controlled by a separate valve upstream of the electrical heating apparatus.

In some of the embodiments of the invention described below, the pressure-responsive device senses the pressure at the inlet to the device to control the energization of the electrical heater; in these embodiments, the electrical heater is normally deenergized, but is automatically energized as soon as the inlet pressure is applied. Such an electrical heater would also be provided with a thermostat control to turn-off the electrical heater when the water therein reaches a predetermined temperature, which can occur quite rapidly if there is no water flow through the electrical heater.

Other embodiments of the invention are described below wherein the pressure-responsive device senses the flow rate through it to control the energization of the electrical heater. In the described preferred embodiments, the pressure-responsive device senses the flow rate by sensing the difference in pressure at the inlet and outlet of the pressure-responsive device. Thus, if the pressure difference is substantially zero, this indicates that there is no flow through that device, and therefore it will not energize the electrical heater; whereas if the pressure difference is significant, this will indicate flow through the device, and therefore the device will energize the electrical heater.

According to further features in further embodiments described below, the pressure-responsive device includes a displaceable member which is displaceable according to the sensed differential pressure and operates the electrical control device, preferably a plurality of electrical switches, to control the electrical heater in accordance with the displacement of the displaceable member. According to one embodiment, the displaceable member actuates all the switches simultaneously; and in other embodiments, it sequentially actuates the electrical switches according to the magnitude of the displacement of that member. This controls the magnitude of the electrical heat produced by the electrical heater according to the water flow rate, so that high heat will be produced at high water flow rates, and lower heat will be produced at lower flow rates.

According to another aspect of the present invention, there is provided electrical heating apparatus for automatically heating water passing therethrough from a cold water supply pipe to a hot water delivery pipe, comprising: a housing including an electrical heater therein; an electrical control device controlling the electrical heater; an inlet conduit connectable between the water supply pipe and the electrical heater for inletting cold water to the electrical heater; a heater coupling communicating with the inlet conduit for inletting water therefrom into the electrical heater; an outlet conduit connectable between the electrical heater and the water delivery pipe for outletting hot water thereto from the electrical heater; and a pressure-responsive device cooperable with the electrical control device to control the electrical heater and having an inlet communicating with the inlet conduit and heater coupling; characterized in that the pressure-responsive device senses the flow rate to or through the electrical heater to control the energization of the electrical heater in response to the sensed flow rate.

According to a still further aspect of the present invention, there is provided a regulating valve comprising a housing; a membrane within the housing; and a stem within the housing having a head of convex configuration facing the membrane but normally spaced therefrom to define a flow-control passageway; the convex configuration of the stem head producing, with the membrane, different cross-sectional areas and thereby different flow rates in the control passageway, creating differential pressures acting on the membrane tending to deform the membrane such as to maintain a relatively constant flow rate through the flow control passageway despite variations in water inlet pressure.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
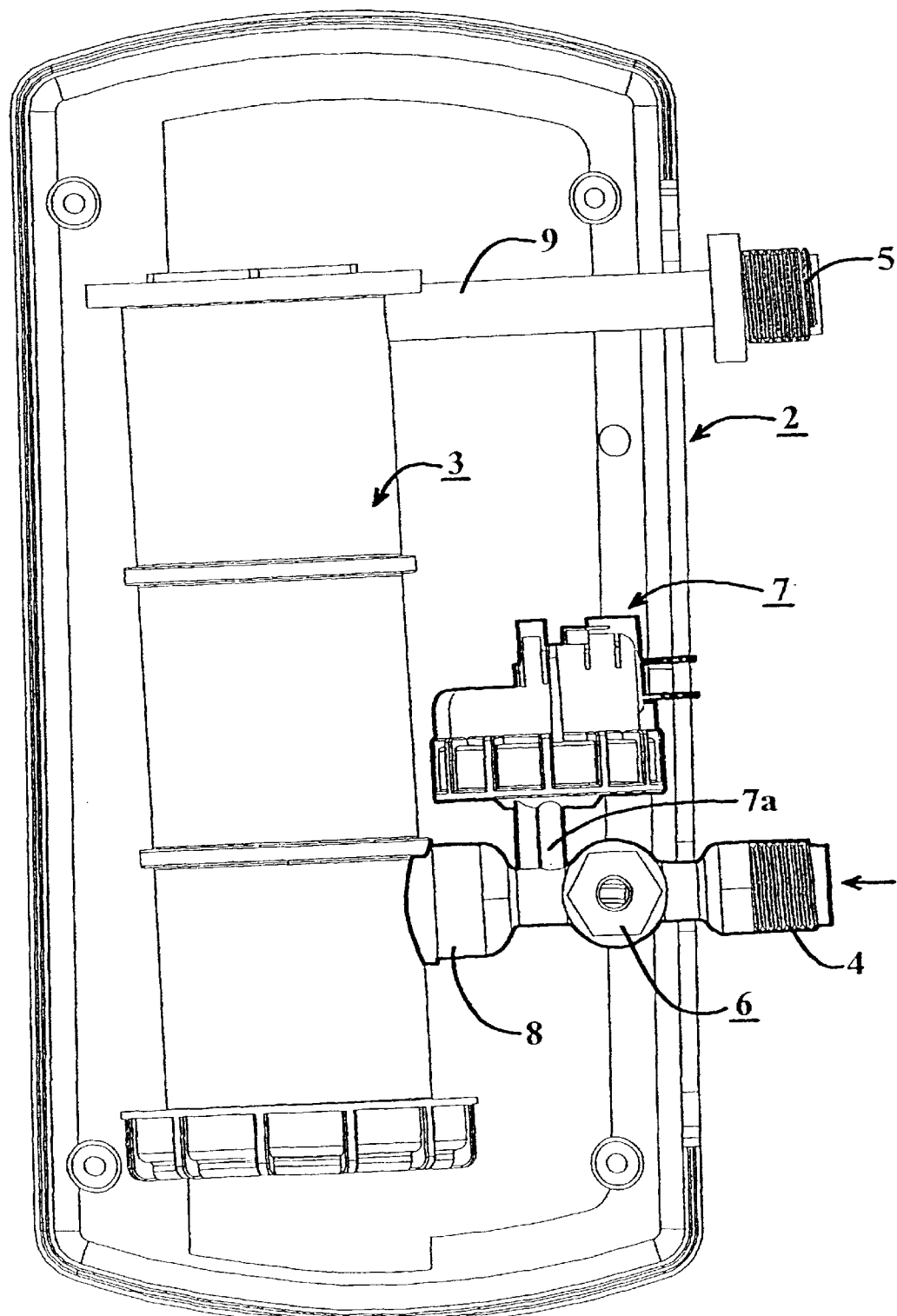
FIG. 1 illustrates one form of electrical heating apparatus constructed in accordance with the present invention.
Figure 2:
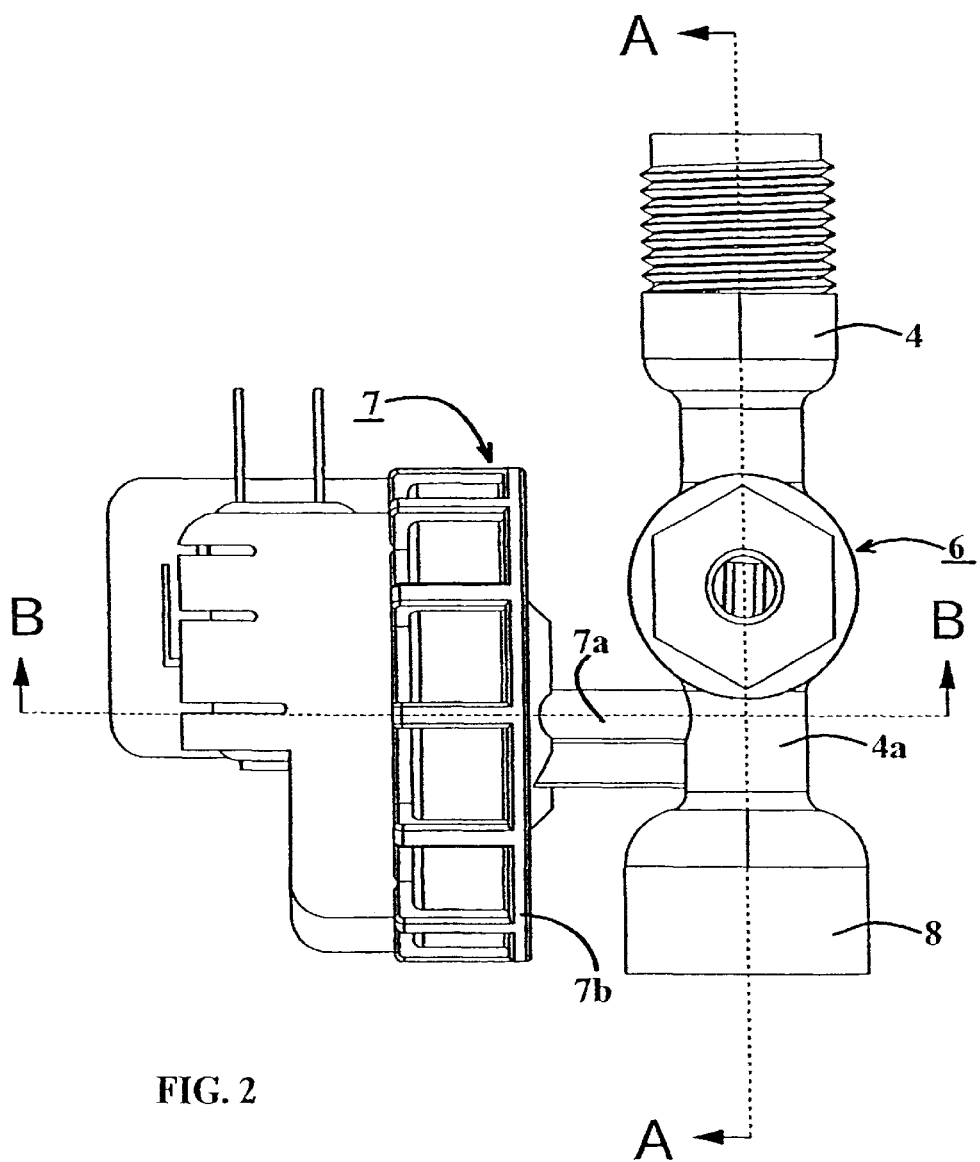
FIG. 2 illustrates the main components of the apparatus of FIG. 1 in accordance with one embodiment of the invention, FIGS. 2a, 2b being sectional views thereof, FIG. 2c being an end view, and FIG. 2d being a sectional view of FIG. 2c.

The Embodiment of FIGS. 1 and 2

FIG. 1 illustrates the overall arrangement of one form of electrical heating apparatus constructed in accordance with the present invention. The illustrated apparatus includes an outer housing 2 containing an electrical heater housing 3 for automatically, and substantially instantaneously, heating water passing through the electrical heater from a cold water supply pipe to a hot water delivery pipe. An inlet conduit 4 is connectable between the water supply pipe (not shown) and the electrical heater 3 for inletting cold water into the electrical heater, and an outlet conduit 5 is connectable between the electrical heater 3 and the water delivery pipe (not shown) for outletting hot water thereto from the electrical heater.

The heating apparatus illustrated in FIG. 1 further includes a control valve 6 which controls the supply of the water to the electrical heater 3, a pressure-responsive device 7 which cooperates with one or more electrical switches therein for controlling the energization of the electrical heater 3, and an inlet coupling 8 for the water heater housing 3 communicating with the inlet conduit 4, and with the inlet 7a to the pressure-responsive device 7, for inletting water into one end of the electrical heater. The other end of the electrical heater 3 includes an outlet coupling 9 connected to the outlet conduit 5.

As indicated earlier, the foregoing components of electrical heating apparatus are normally produced as separate units, which therefore requires considerable time and effort for assembling the units when installing the apparatus, and also for disassembling them when repair and/or maintenance is required. The invention, as described more particularly below, incorporates many of the foregoing parts as integral units and thereby greatly facilitates installation, maintenance and repair of such apparatus.

One preferred construction is more clearly illustrated in FIGS. 2 and 2a–2d.

Figure 2A:
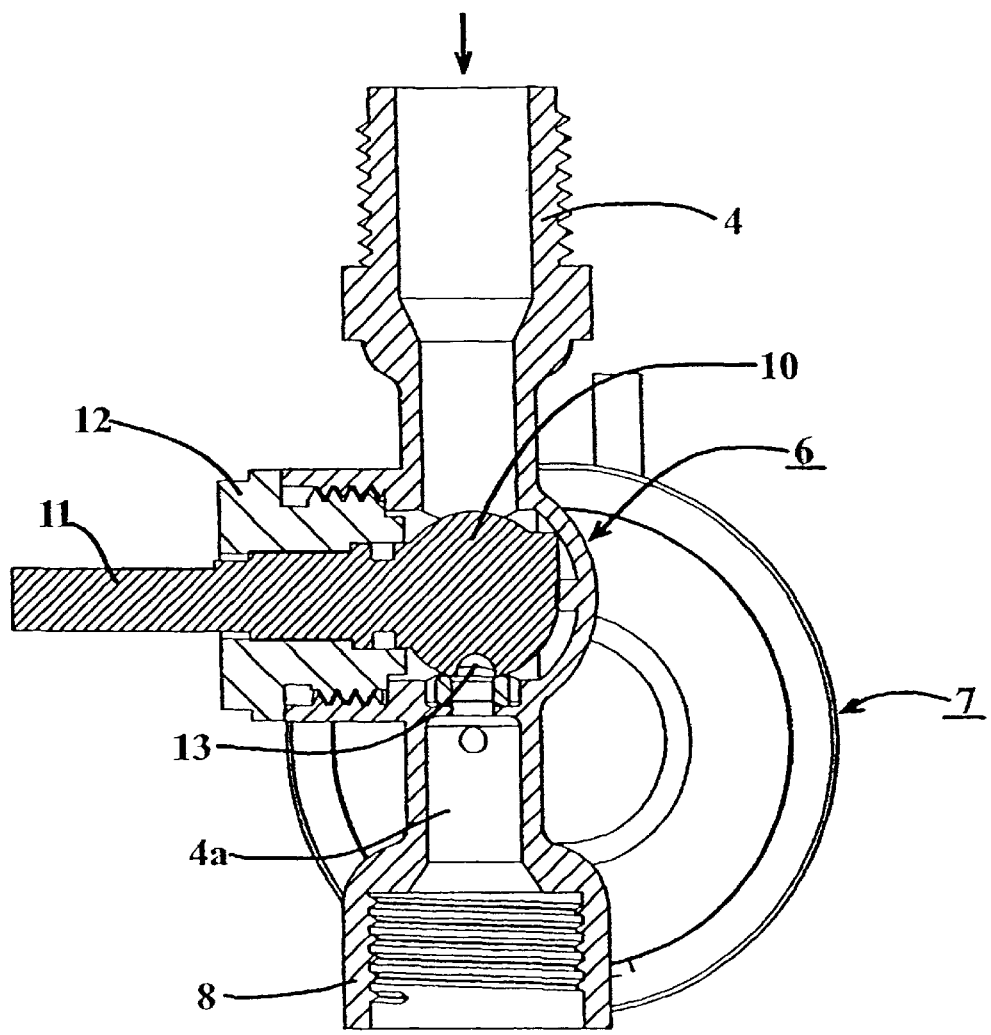

FIG. 2 illustrates the inlet conduit 4, the manual control valve 6, the pressure-responsive device 7, and the heater coupling 8. As shown in FIG. 2a, the inlet conduit 4 is integrally formed with the housing of the manual control valve 6 and also with the heater coupling 8; and as shown in FIG. 2d, the juncture 4a of the inlet coupling 4 between the manual control valve housing 6 and the heater coupling 8 is integrally formed with the inlet 7a and a part of the housing 7b of the pressure-responsive device 7.

As further shown in FIG. 2a, the manual control valve 6 is a ball valve, including a ball 10 rotatably mounted within a socket in its housing between the inlet conduit 4 and the heater coupling 8. Ball 10 is formed with a stem 11 projecting through a fitting 12 threaded into the housing of the control valve 6, permitting the ball 10 to be rotated about the axis of the stem 11. The outer surface of ball 10 is formed with a groove 13 extending for a part of the circumference of the ball. As particularly shown in FIG. 2d, groove 13 is aligned with the passageway between the inlet conduit 4 and the heater coupling 8 so as to control the water flow through that passageway to the electrical heater.

Figure 2B:
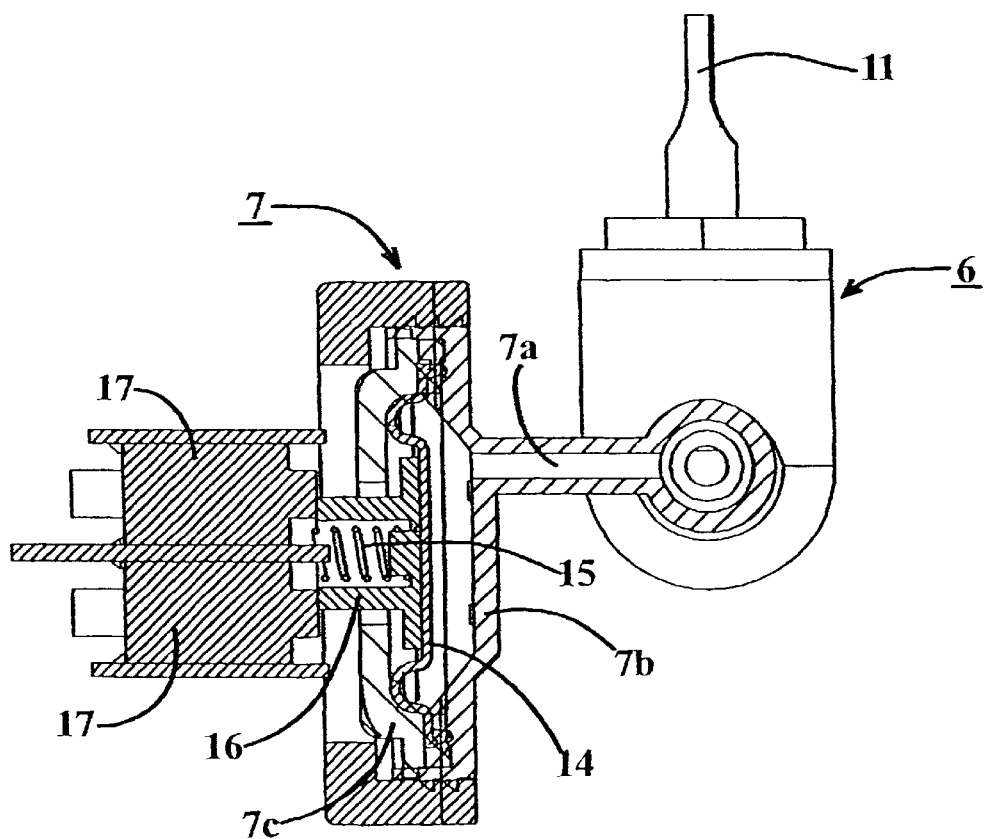
Figure 2C:
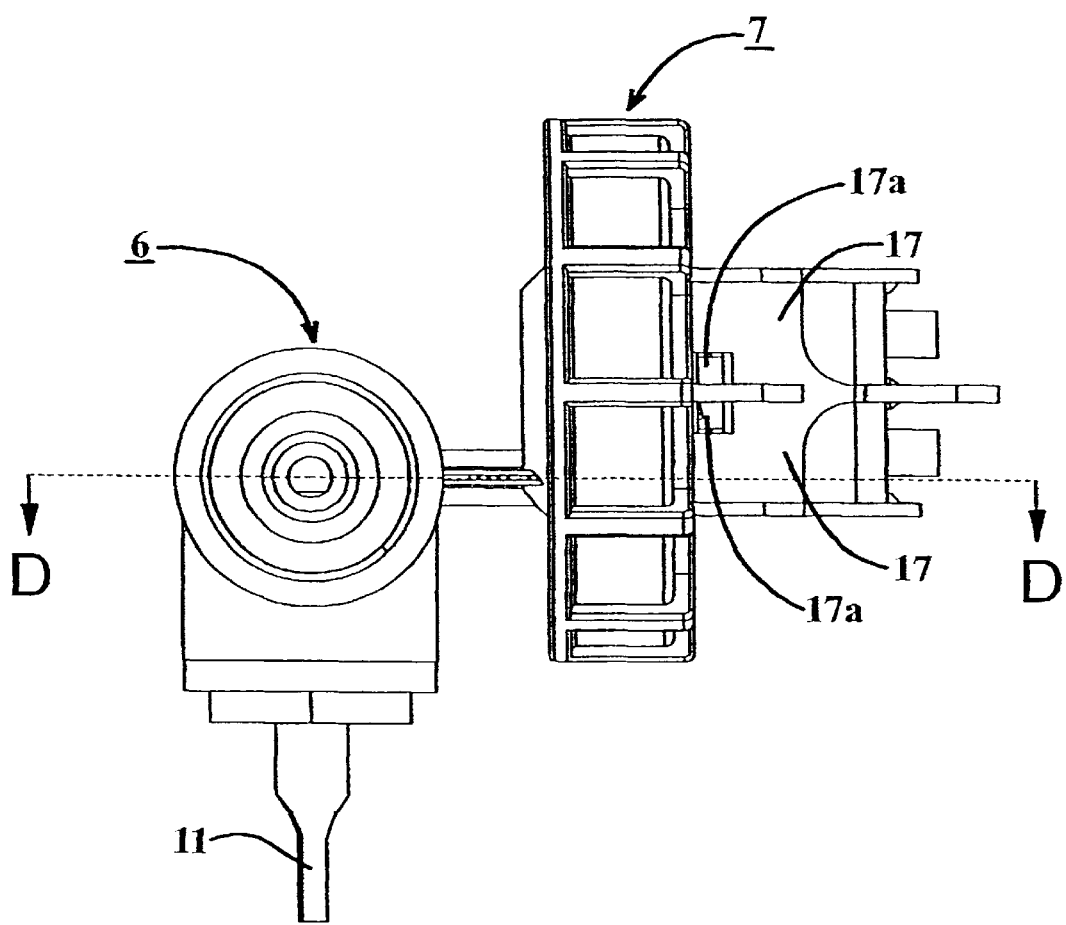
Figure 2D:
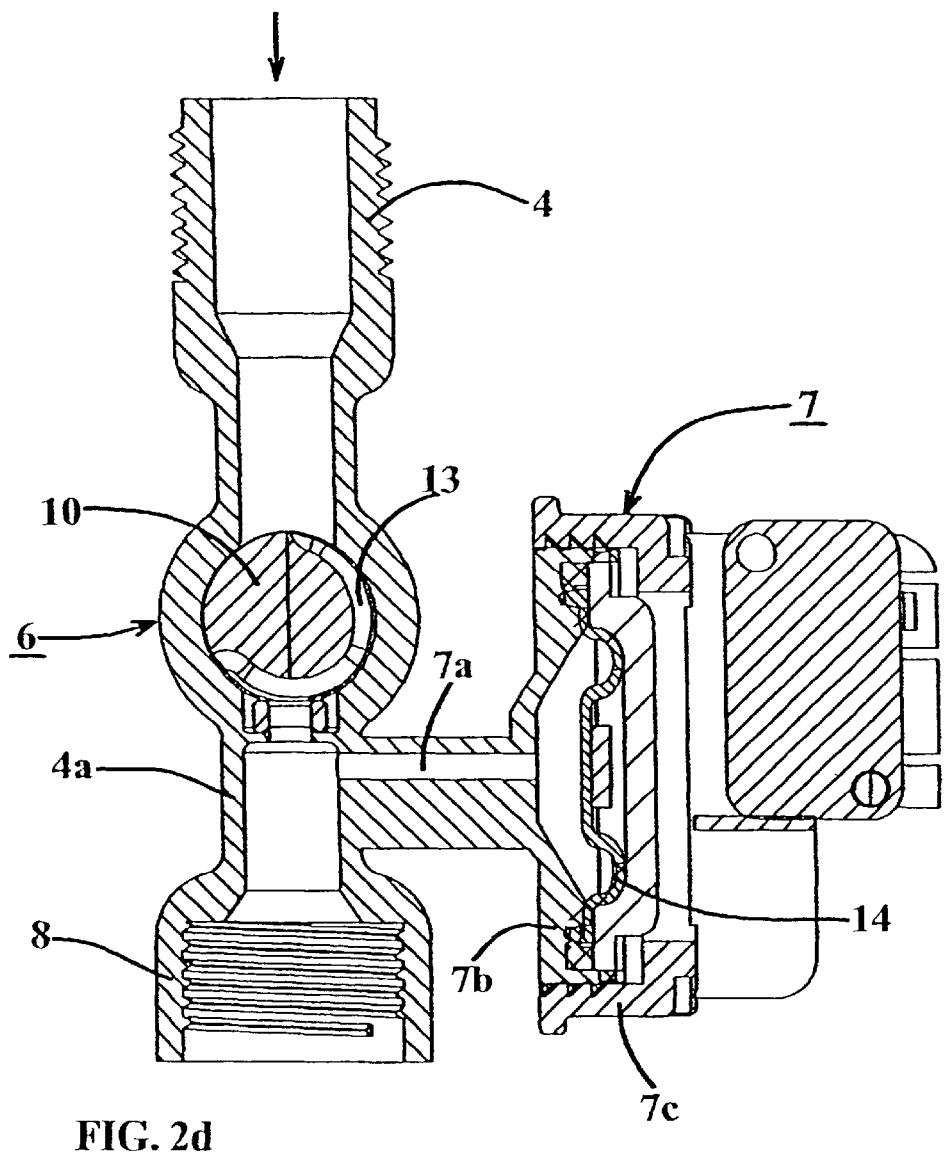

As also shown in FIG. 2d, the inlet 7a to the pressure-responsive device 7 is downstream of the manual control valve 6. The pressure-responsive device 7 includes, in addition to housing section 7b integrally formed with its inlet 7a, another housing section 7c threadedly receiving housing section 7b. A membrane 14 is clamped between the two housing sections 7b, 7c such that one face of the membrane is exposed to the inlet pressure (downstream of valve 6) via inlet 7a, while the opposite face of membrane 14 is biased by a spring 15 (FIG. 2b). The latter face carries a stem 16 which is displaceable against the action of spring 15 according to the inlet pressure as applied via inlet 7a.

The pressure-responsive device 7 further includes a pair of electrical switches 17 having operators 17a (FIG. 2c) engageable by stem 16 when displaced by the inlet pressure a predetermined distance. Electrical switches 17 control the energization of the electrical heater 3. Thus, when no water pressure is applied to the inlet 7a, membrane 14 is normally urged by spring 15 to position stem 16 to disengage the switch operators 17a; but upon the application of pressurized water to the inlet conduit 4, appearing at the inlet 7a of the pressure-responsive device 7, membrane 14 is pressed inwardly against spring 15 to move stem 16 to engage the switch operators 17a simultaneously and thereby to energize the electrical heater 3.

This arrangement as illustrated in FIG. 2 thus energizes the electrical heater as soon as the inlet water is turned on. Such an electrical heater commonly includes a thermostat (not shown) which automatically deenergizes the electrical heater 3 when the water is heated to a predetermined temperature.

The Embodiment of FIGS. 3 and 3a–3d

FIGS. 3 and 3a–3d illustrate apparatus very similar to that of FIG. 2 except that instead of including a manually presettable control valve 6, the apparatus is provided with a regulating control valve for automatically regulating the water flow therethrough so as to be at a relatively constant rate despite variations in the water inlet pressure. To facilitate understanding, those parts which are common to the apparatus described above are identified by the same reference numerals, whereas the regulating valve is identified generally by the reference numeral 30 in FIG. 3.

Figure 3:
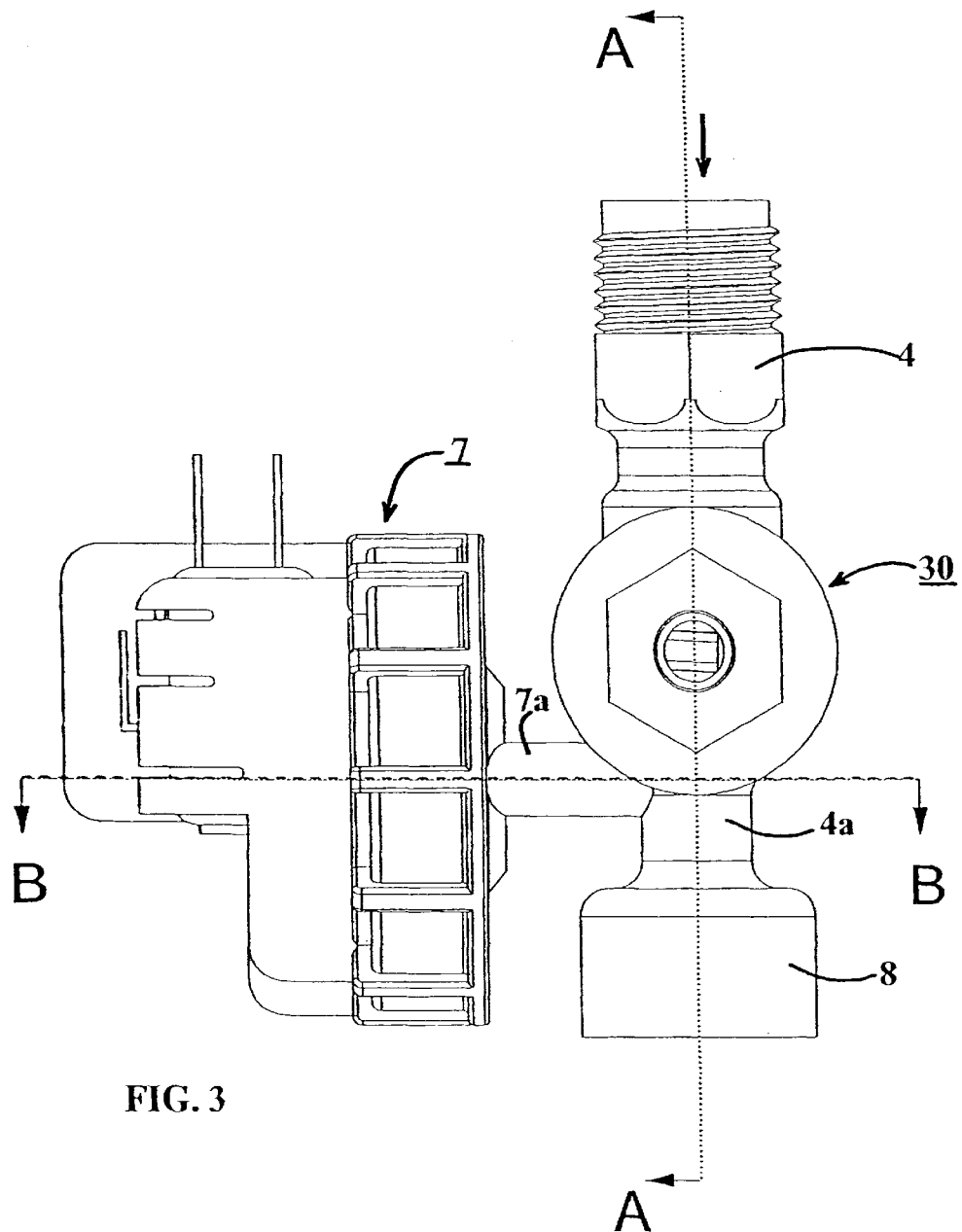
FIG. 3 illustrates the main components of a second embodiment of the invention, FIGS. 3a and 3b being sectional views thereof along lines B—B and C—C, respectively, FIG. 3c illustrating the fully closed condition of the valve, and FIG. 3d illustrating the fully open condition of the valve.
Figure 3A:
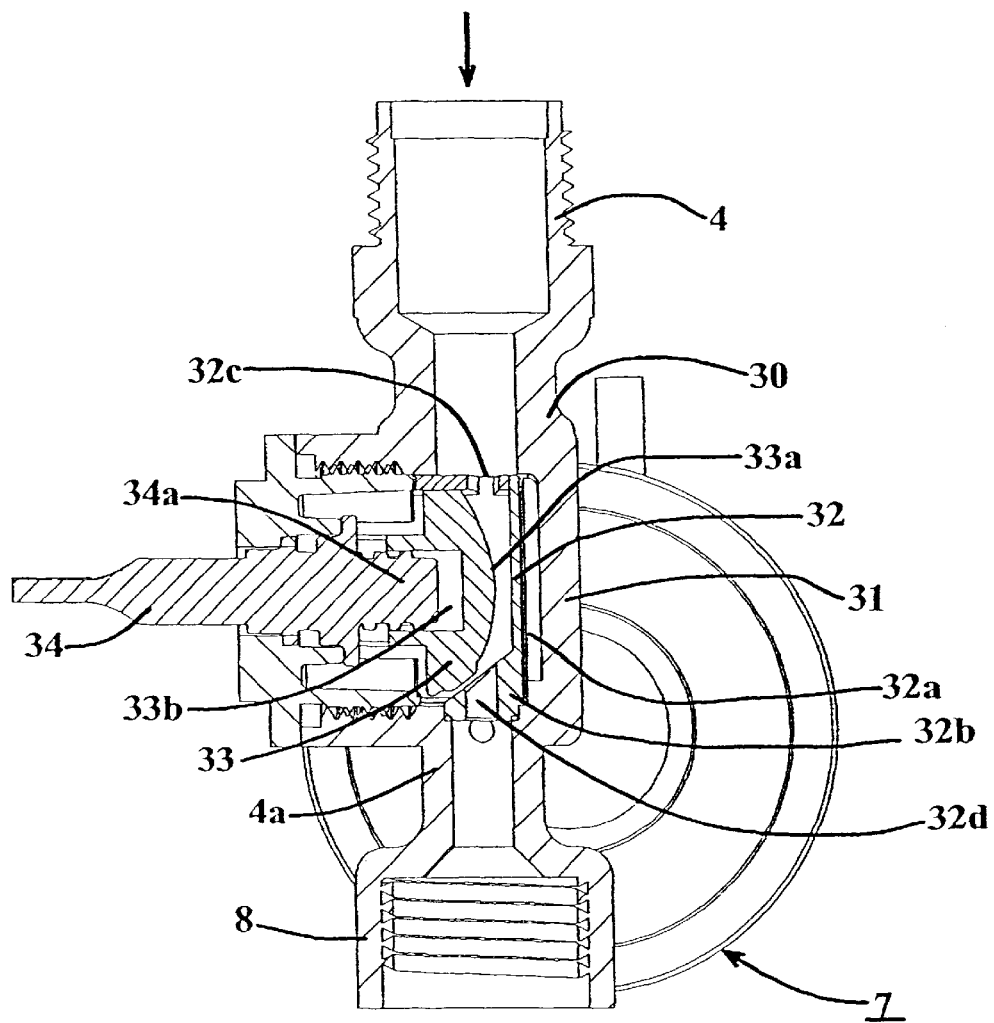
Figure 3B:
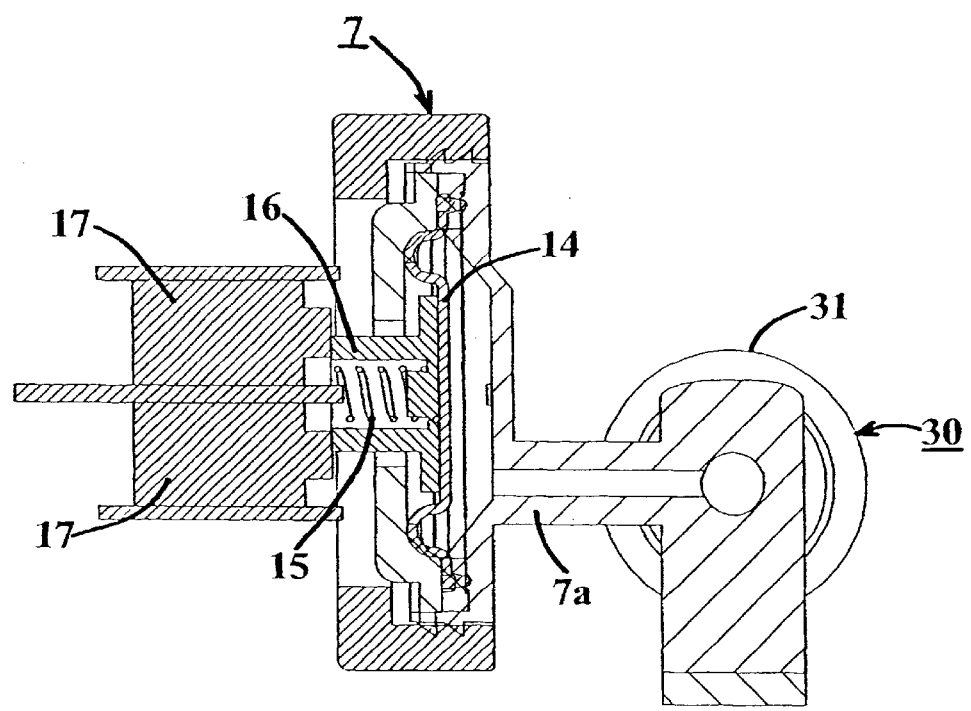

As shown particularly in FIGS. 3a and 3b, regulating valve 30 includes a housing 31 also integrally formed with the inlet conduit 4, the heater coupling 8, and the inlet 7a to the pressure-responsive device 7. Housing 31 encloses a membrane 32 of cap shape having an end wall 32a and a cylindrical side wall 32b. Side wall 32b is formed with an inlet 32c communicating with the inlet conduit 4, and with an outlet 32d communicating with the heater coupling 8.

The illustrated regulating valve further includes a stem head 33 of convex configuration facing the membrane end wall 32a but normally spaced therefrom to define a flow-control passageway between inlet 32c and outlet 32d. Thus, the outer convexly-curved face 33a produces, with membrane end wall 32a, a flow-control passageway having a small cross-sectional area at the center of face 33a, and larger cross-sectional areas at the outer perimeter of face 33a. This difference in cross-sectional areas produces different flow rates, i.e., a high flow rate at the center of face 33a, and lower flow rates at the outer perimeter of this face. The high flow rate at the center of face 33a produces a low pressure at this region, whereas the low flow rates at the perimeter of the face produces higher pressures at this region. Accordingly, these differential pressures act on the membrane wall 32a to deform that membrane such as to maintain a relatively constant flow rate through the control passageway despite variations in the water inlet pressure.

Stem head 33 is presettable with respect to the membrane end wall 32a to preset the flow rate. For this purpose, the stem 34, carrying stem head 33, is rotatably mounted with respect to housing 31 and includes a threaded tip 34a threadedly received within a threaded bore 33b of the head, such that rotation of the stem 34 in one direction moves stem head 33 towards membrane end wall 32a, and rotating the stem in the opposite direction, moves the stem head away from the membrane wall.

Figure 3C:
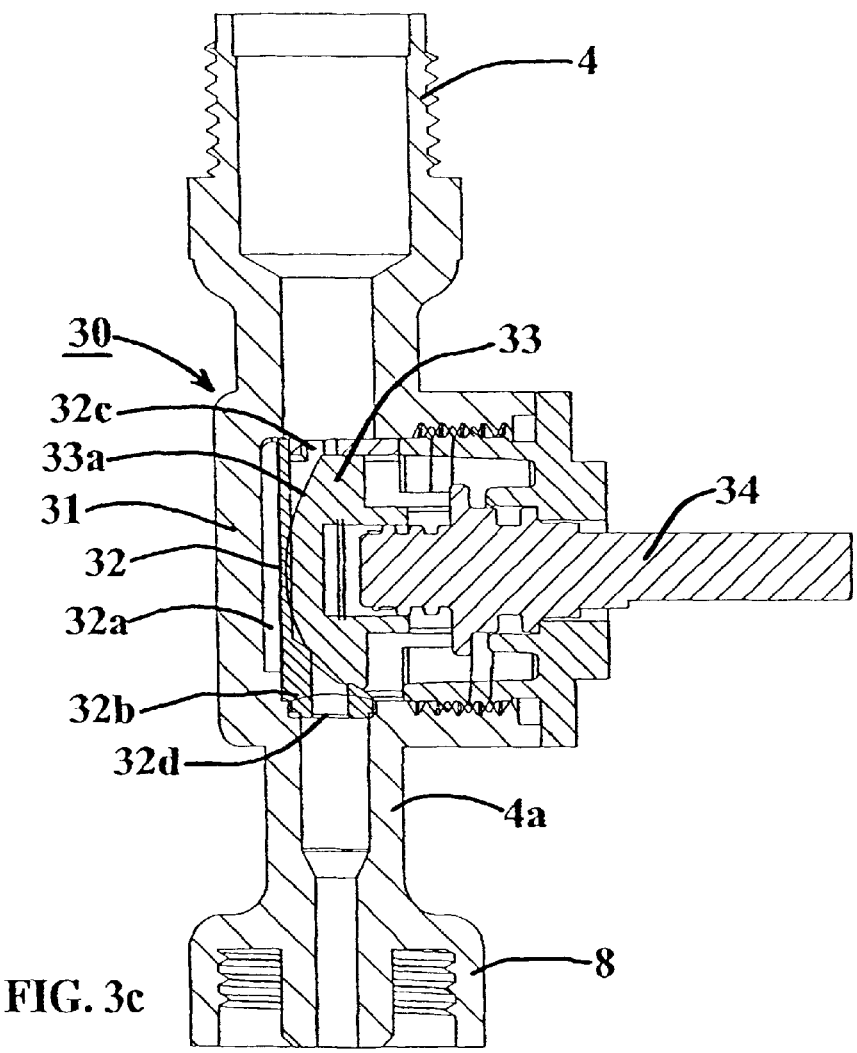
Figure 3D:
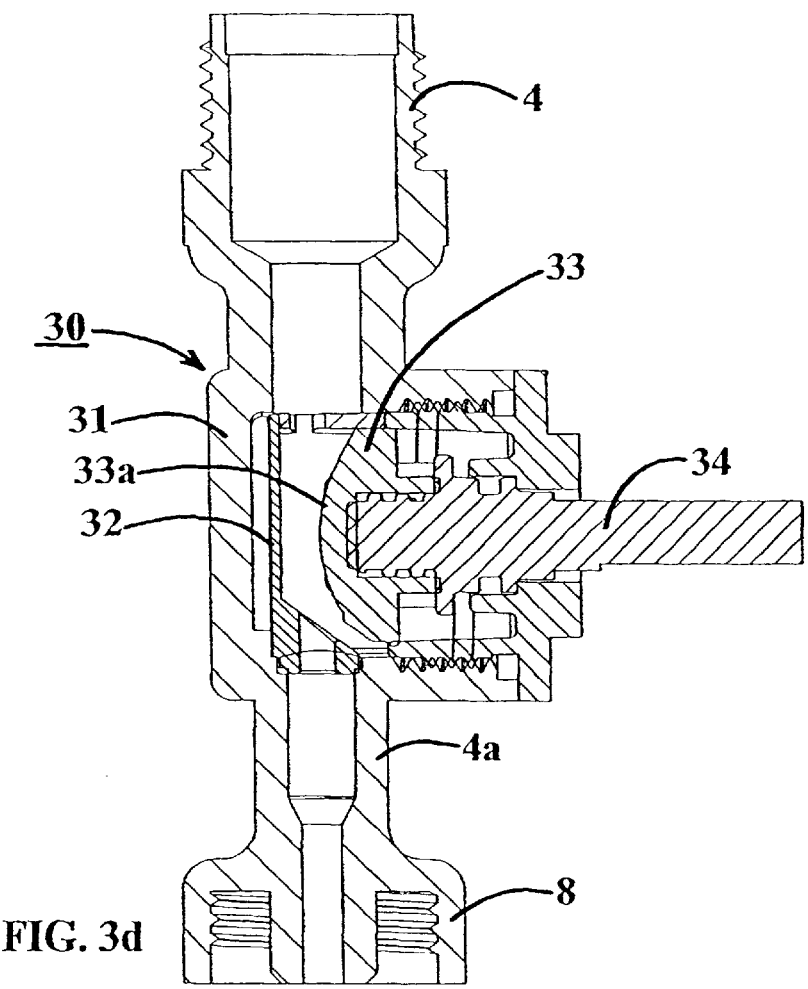

FIG. 3c illustrates the fully closed position, and FIG. 3d illustrates the fully open position, of this passageway between the convex surface 33a and membrane end wall 32a.

In all other respects the apparatus illustrated in FIG. 3, and its sectional views 3a–3d, is substantially the same as described above with respect to FIG. 2, and therefore the same reference numerals have been used to identify corresponding elements.

Figure 4:
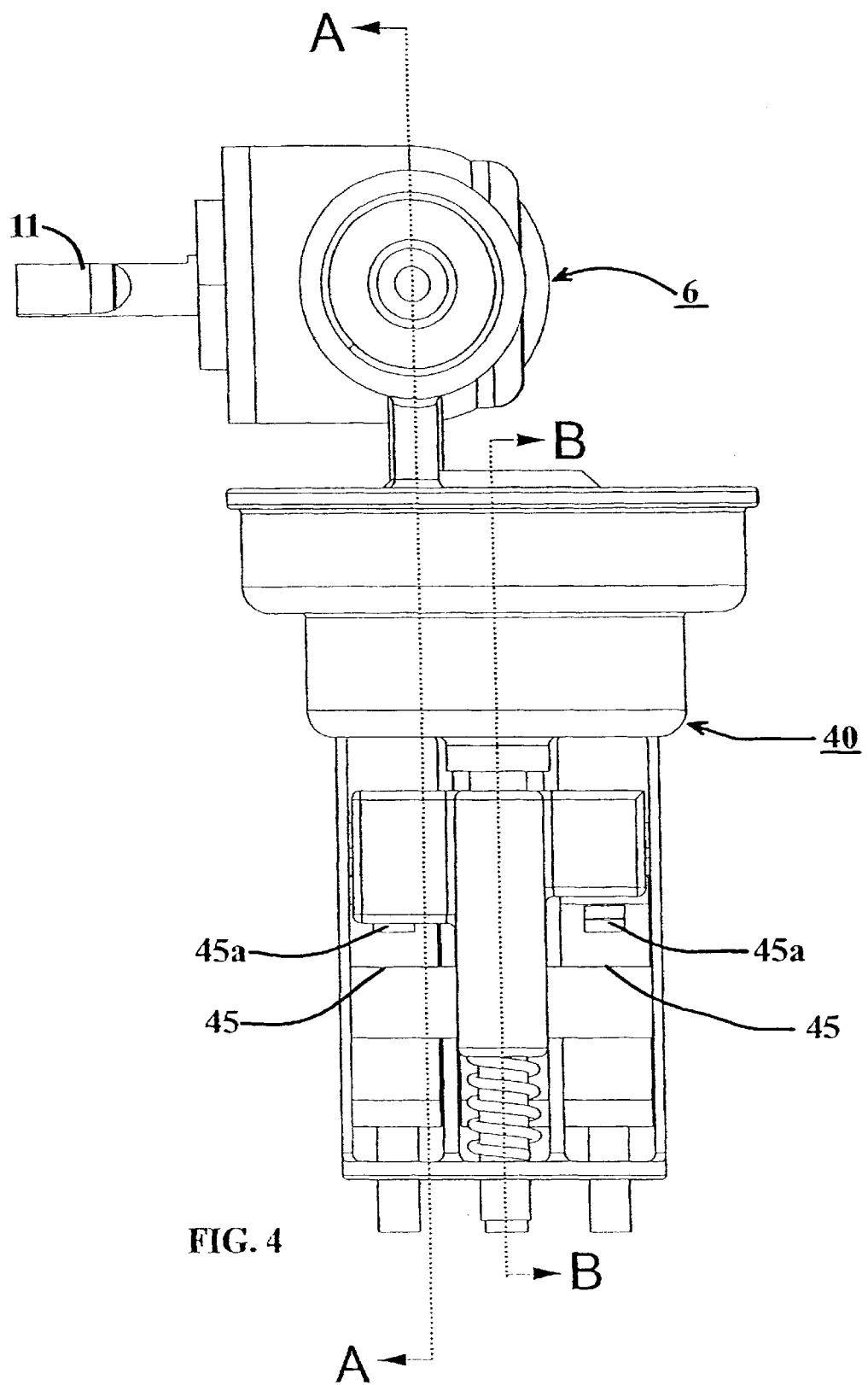
FIG. 4 illustrates a third embodiment of the invention, FIGS. 4a and 4b being sectional views along lines A—A and B—B of FIG. 4.
Figure 4A:
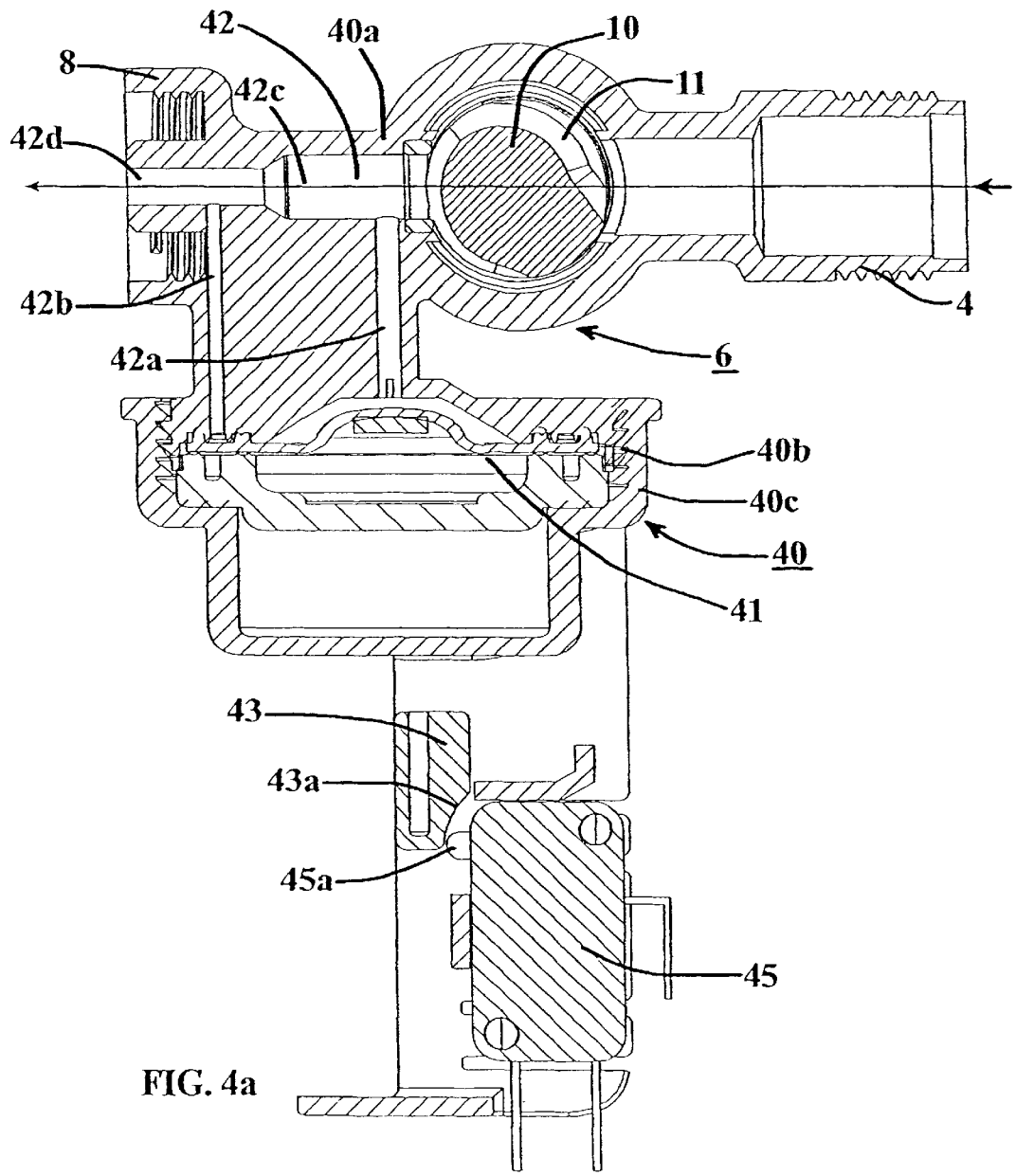
Figure 4B:
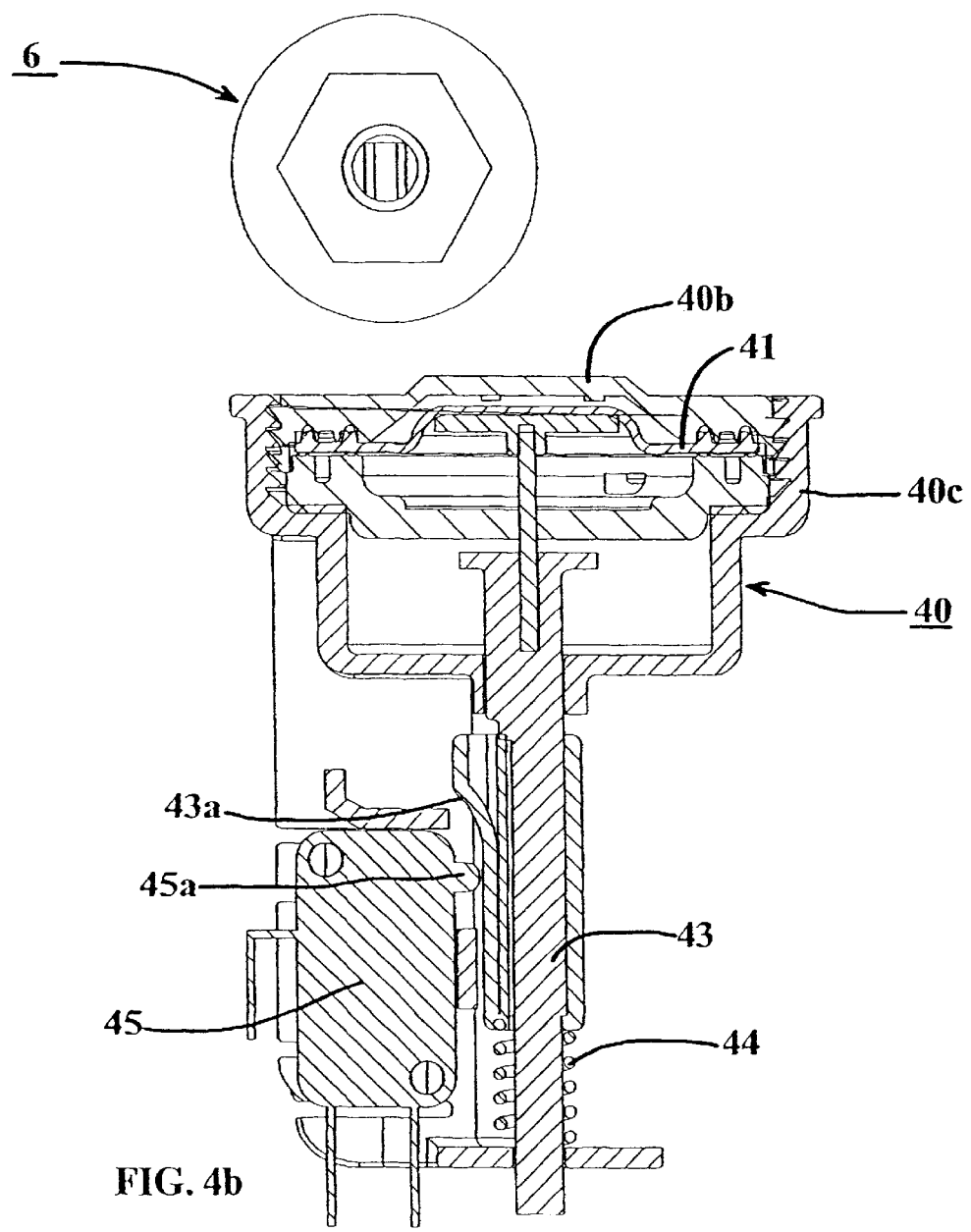
Figure 5:
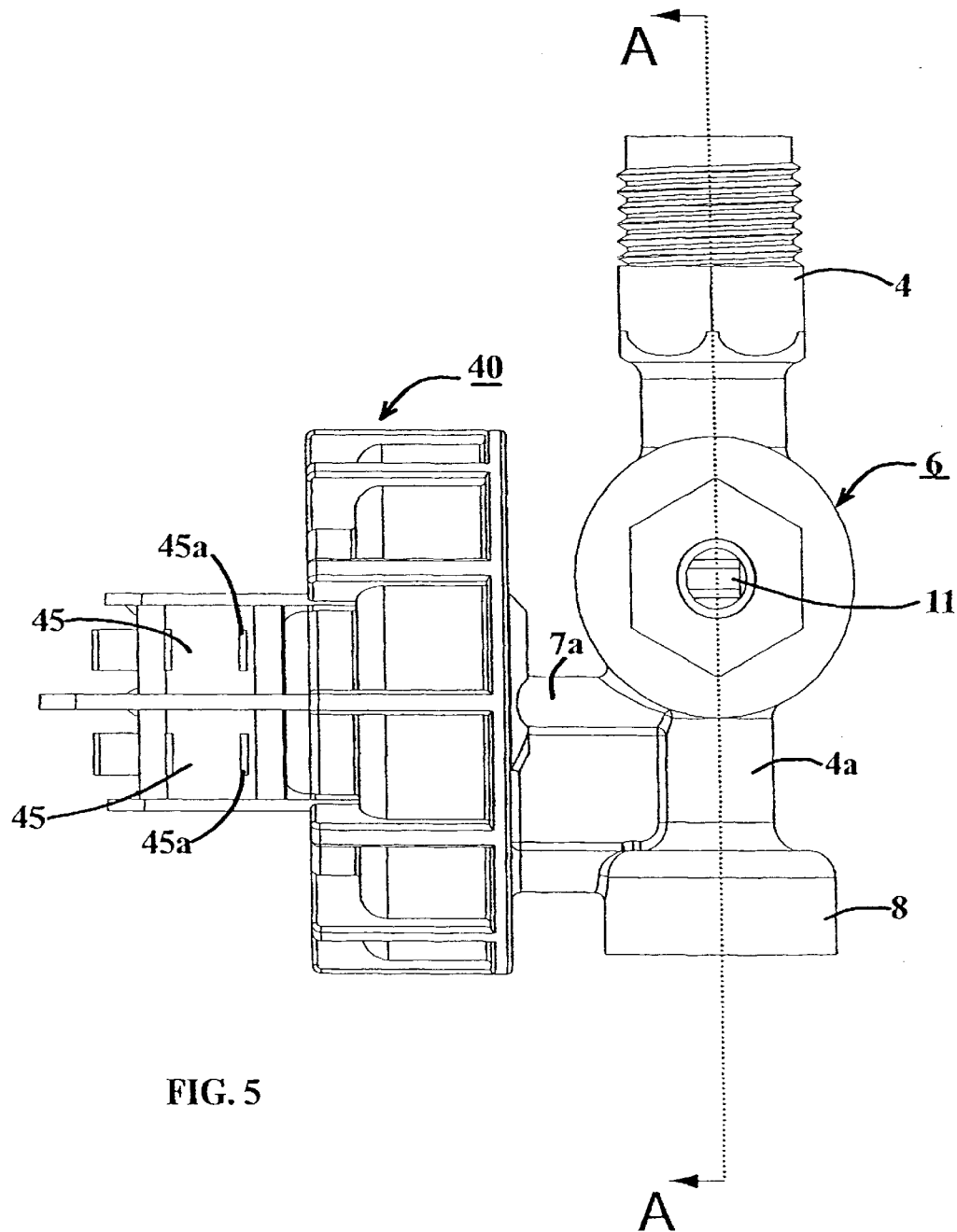
FIG. 5 illustrates the main components of a fourth embodiment of the invention, FIG. 5a being a sectional view thereof long line A—A, FIG. 5b being an end view (from the left side) of FIG. 5, and FIGS. 5c and 5d being sectional views along lines C—C and D—D, respectively of FIG. 5b.
Figure 5A:
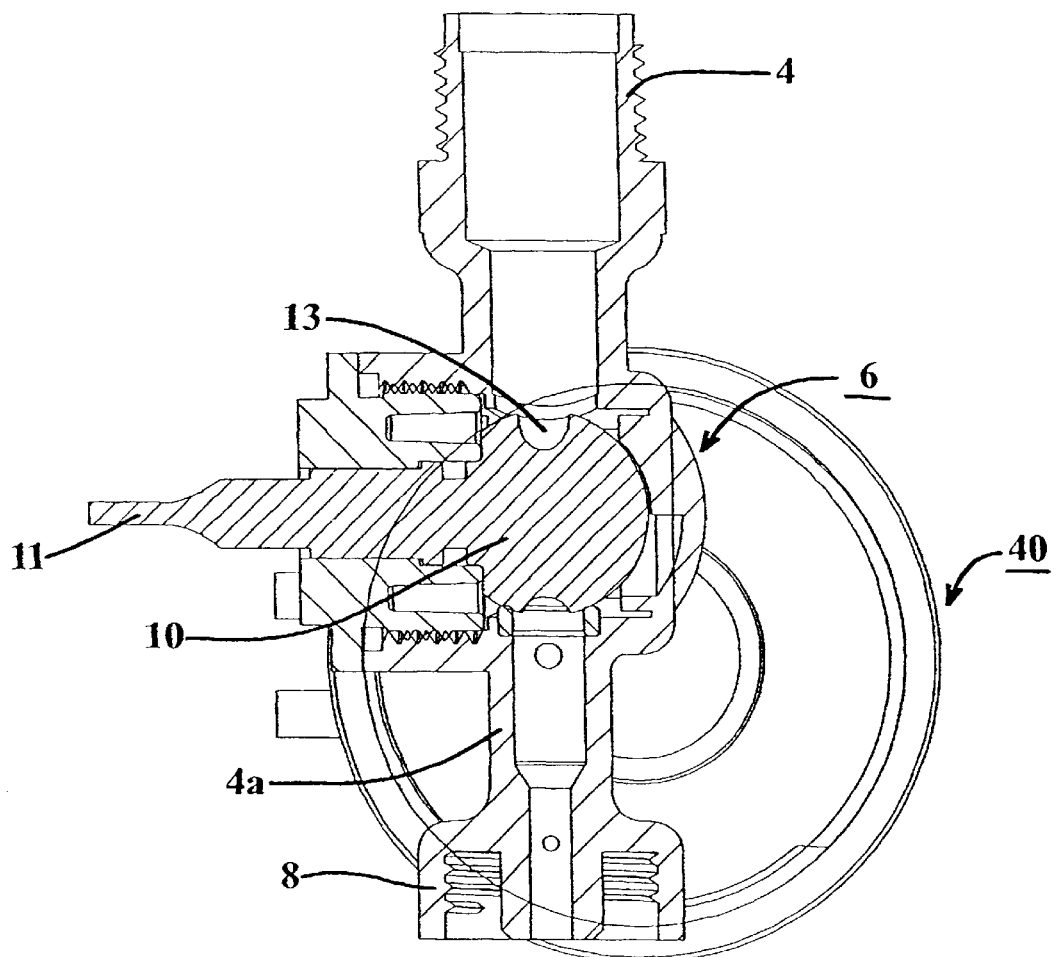
Figure 5B:
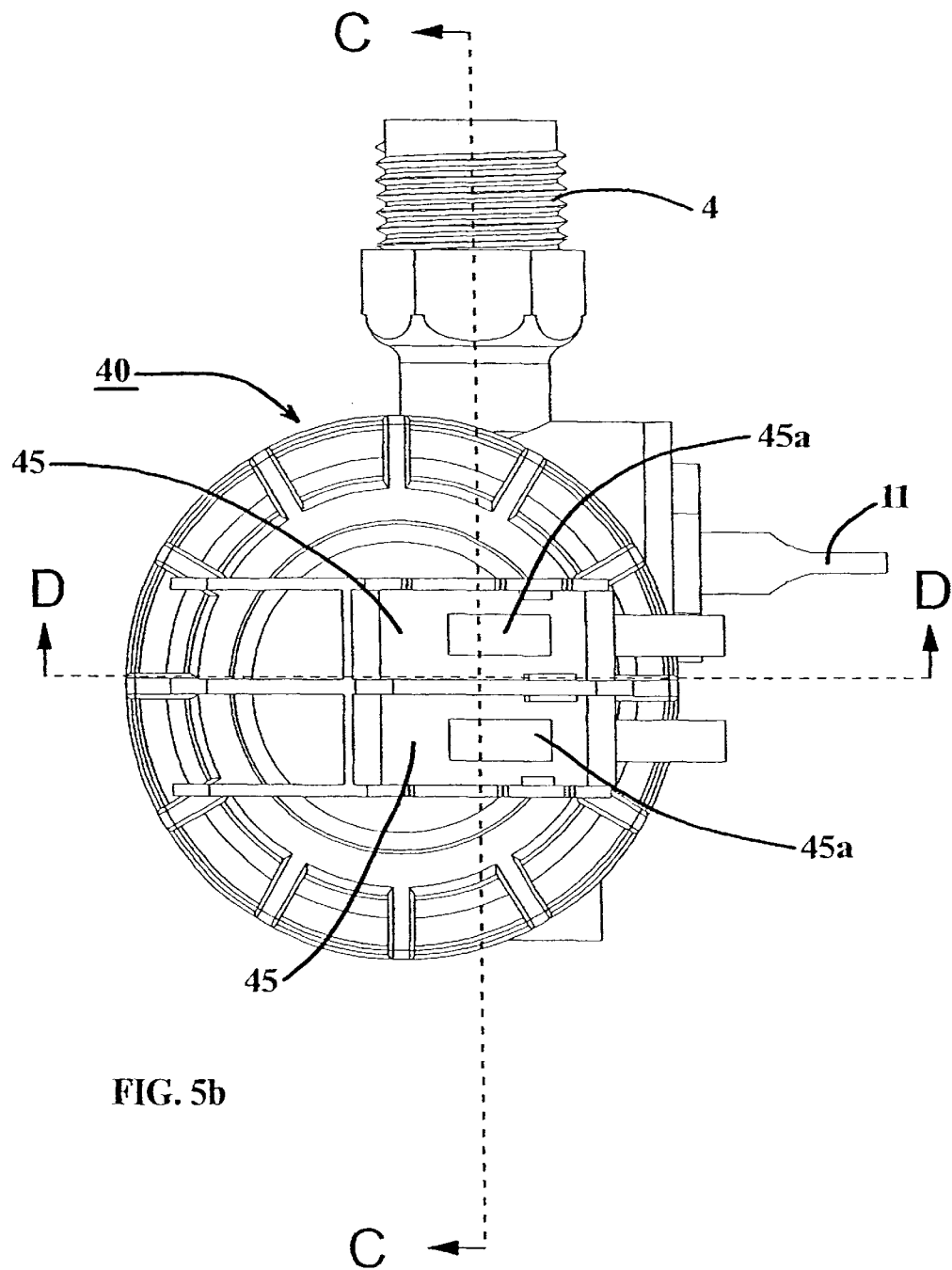
Figure 5C:
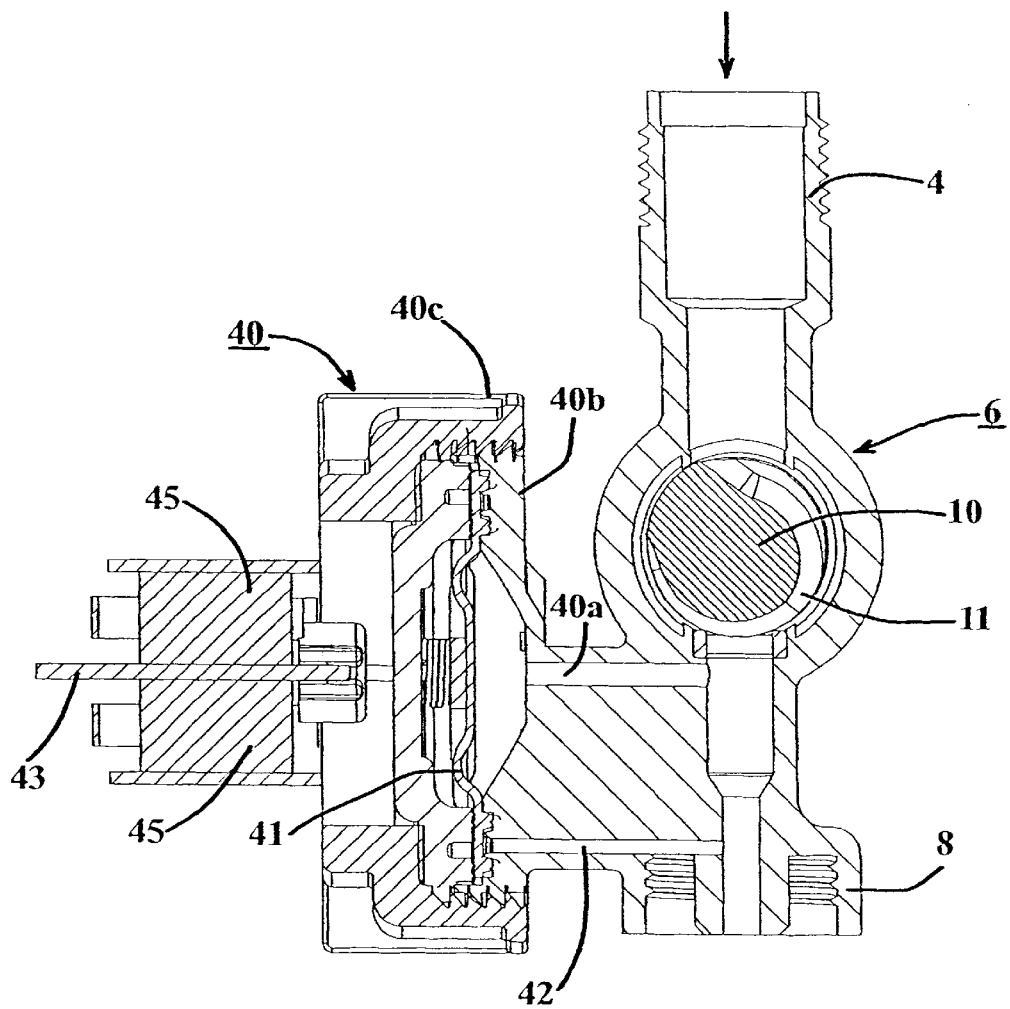
Figure 5D:
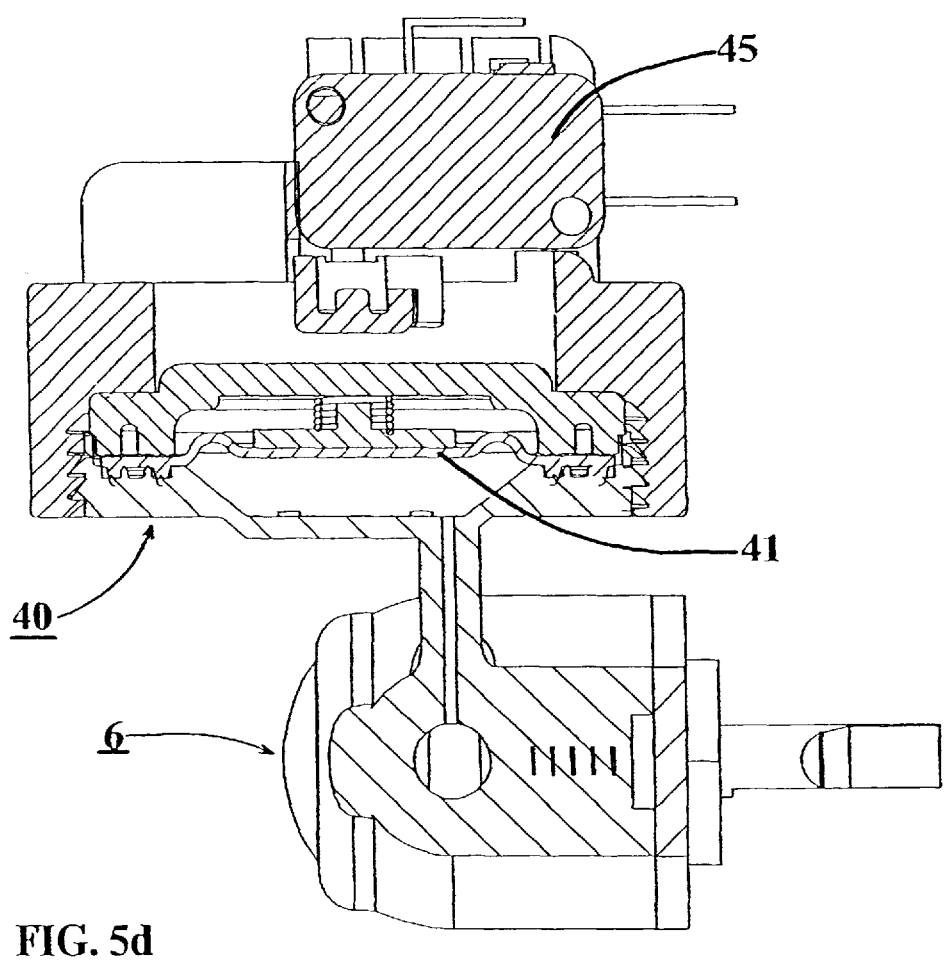

The Embodiment of FIGS. 4 and 4a–4b

The apparatus of FIGS. 4 and 4a–4b is similar to that of FIG. 2, except that a different pressure-responsive device, generally designated 40, is used for the device 7 in FIG. 2.

As shown particularly in FIG. 4a, the pressure-responsive device 40 in the apparatus of FIG. 4 also includes an inlet section 40a and a first housing section 40b both integrally formed with the inlet conduit 4 and the heater coupling 8. As in FIG. 2, a second housing section 40c is threadedly received on housing section 40b, and a membrane 41 is clamped between the two housing sections.

The inlet section 40a includes a passageway 42 communicating with the heater coupling 8. Passageway 42 also communicates via a bore 42a with one side of the membrane 41, and in a further bore 42b, with the opposite side of the membrane. As seen particularly in FIG. 4a, bore 42a communicates with a large-diameter section 42c of passageway 42, and bore 42b communicates with a reduced-diameter section 42d of passageway 42 down-stream of bore 42a.

Accordingly, membrane 41 will be subjected to the differential pressure of that at bore 42a as compared to that at bore 42b. Bore 42a communicates with passageway section 42c which is of larger diameter than passageway section 42d with which bore 42b communicates.

Thus, whereas in the pressure-responsive device 7 of FIG. 2 the membrane is sensitive only to the inlet pressure, in the device 40 of FIG. 4, the membrane 41 is sensitive to the flow rate through the inlet conduit 4 to the heater coupling 8. That is, if there is no flow in passageway 42 the pressures at the two bores 42a, 42b, will be equal, and since they are applied to opposite sides of the membrane, the membrane will not be flexed; whereas if there is flow in this passageway, the pressure at bore 42b will be less than that at bore 42a, by a magnitude depending on the flow rate, thereby causing the membrane 41 to flex according to the flow rate.

By having downstream bore 42b communicate with the smaller diameter portion, 42d, of passageway 42, there is an amplification of the pressure difference between the upstream bore 42a, which communicates with the upstream and larger diameter portion 42c, and the downstream bore 42b.

As shown particularly in FIG. 4b, membrane 41 is coupled to a stem 43 urged by a spring 44 to a normal position, and is displaceable by the membrane to actuate a plurality of switches 45. Thus, stem 43 includes a cam surface 43a which is movable to engage or disengage the switch operators 45a. In the illustrated example as shown particularly in FIG. 4, there are preferably three such electrical switches 45 located so that their switch operators 45a are sequentially engaged by cam surface 43a of stem 43 during the axial displacement of the stem by the membrane 41.

The electrical switches 45 control the energization of the electrical heater 3. Accordingly, when there is no water flow via inlet conduit 4, manual control valve 6, and heater coupling 8 to the electrical heaters, the pressure at the two inlets 40a, 42 (FIG. 4a) will be equal, and therefore there will be no deflection of the membrane 41; accordingly, none of the electrical switches 45 will be actuated by stem 43. However, as water flow starts through the inlet conduit 4 via the manual control valve 6, the flow to the heater coupling 8 will cause the pressure at inlet 42 to drop with respect to that at inlet 40a, an amount corresponding to the difference in the flow rates in passageways 42a and 42b. Thus, at relatively small rates of flow, the membrane 41 will displace stem 43 only a small amount, e.g., to actuate one of the electrical switches 45; whereas at higher flow rates, the membrane will be deflected to produce a larger displacement of the stem, and thereby to cause two or all three of the electrical switches to be actuated, to increase the amount of electricity applied to the electrical heater 3.

In all other respects the embodiment of FIG. 4 is constructed as described above with respect to FIG. 2, and therefore its corresponding parts are correspondingly numbered to facilitate understanding.

The Embodiment of FIGS. 5 and 5a–5d

FIGS. 5 and 5a–5d illustrate an apparatus similar to that of FIG. 4, except that instead of providing three electrical switches 45 actuated by the membrane 41 via its stem 43, there are provided two such electrical switches 45 sequentially actuated by the displaceable stem. It will be appreciated that the apparatus could include any desired number of electrical switches according to the desired control of the electrical heater in response to the water rate flowing to the electrical heater.

To facilitate understanding the parts in the apparatus of FIGS. 5 and 5a–5d corresponding 6 those in FIGS. 4 and 4a–4d, as well as in the other drawing figures, are correspondingly numbered.

Figure 6:
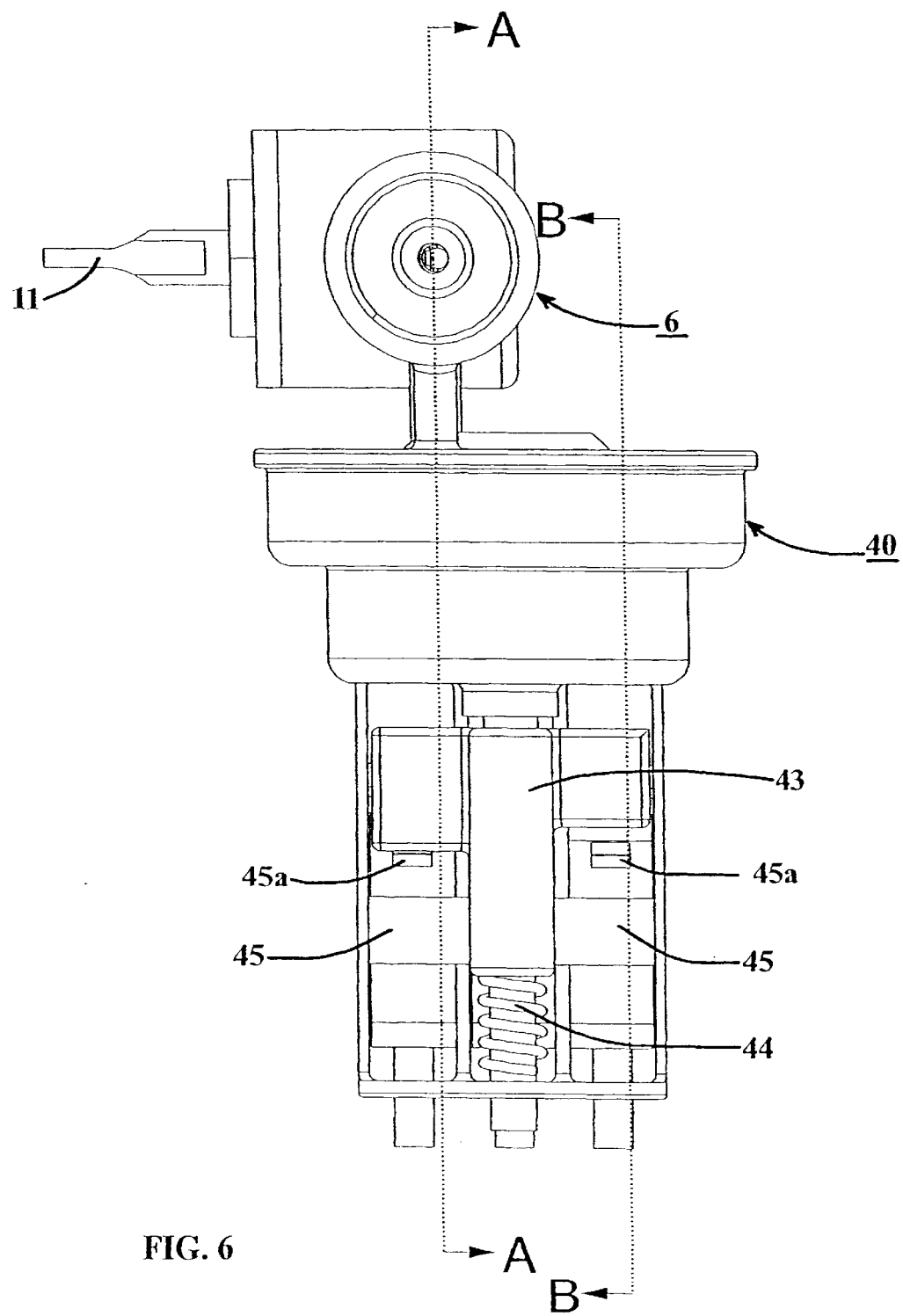
FIG. 6 illustrates a fifth embodiment of the invention, FIGS. 6a and 6b being sectional views along lines A—A and B—B of FIG. 6, respectively.
Figure 6A:
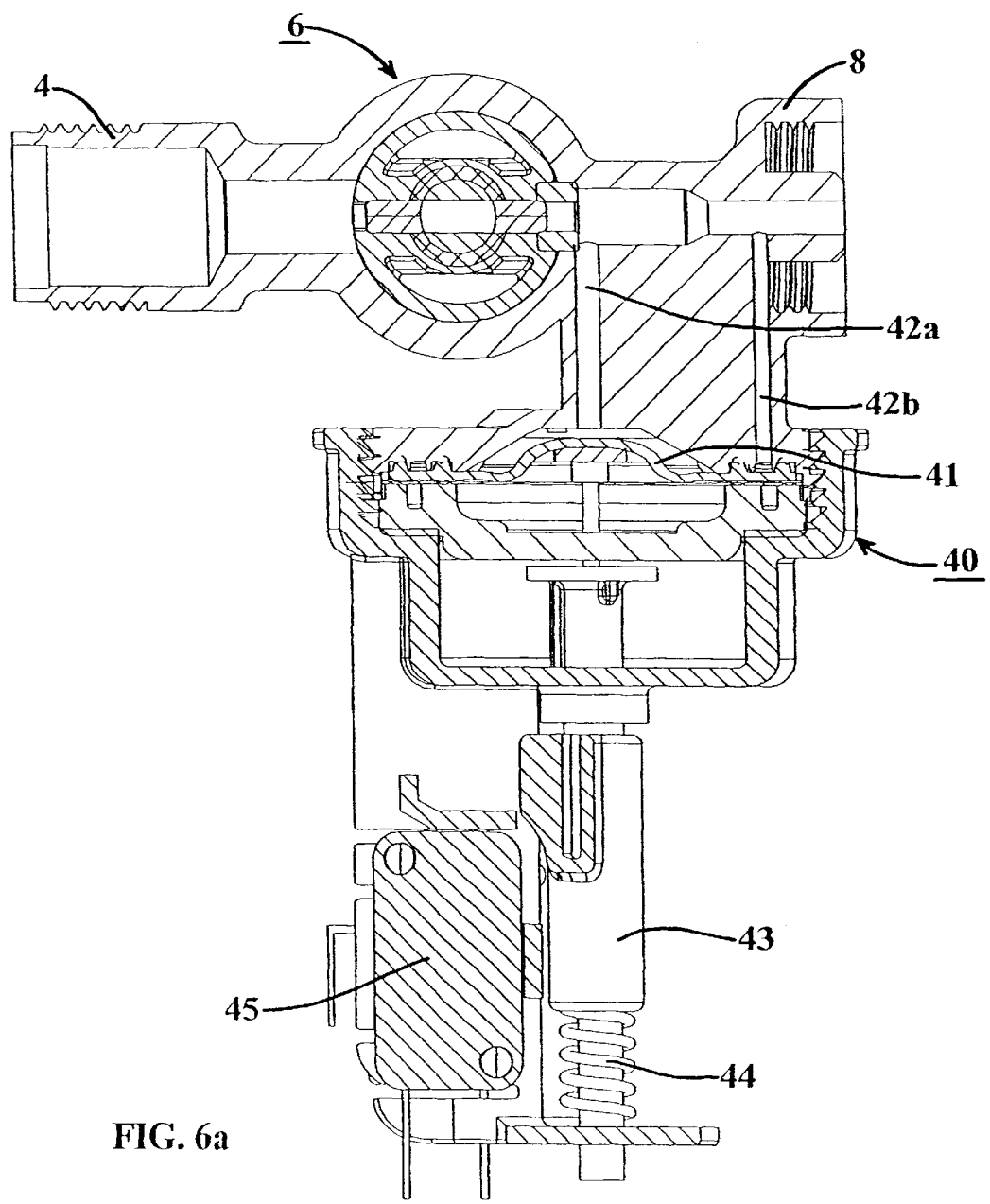
Figure 6B:
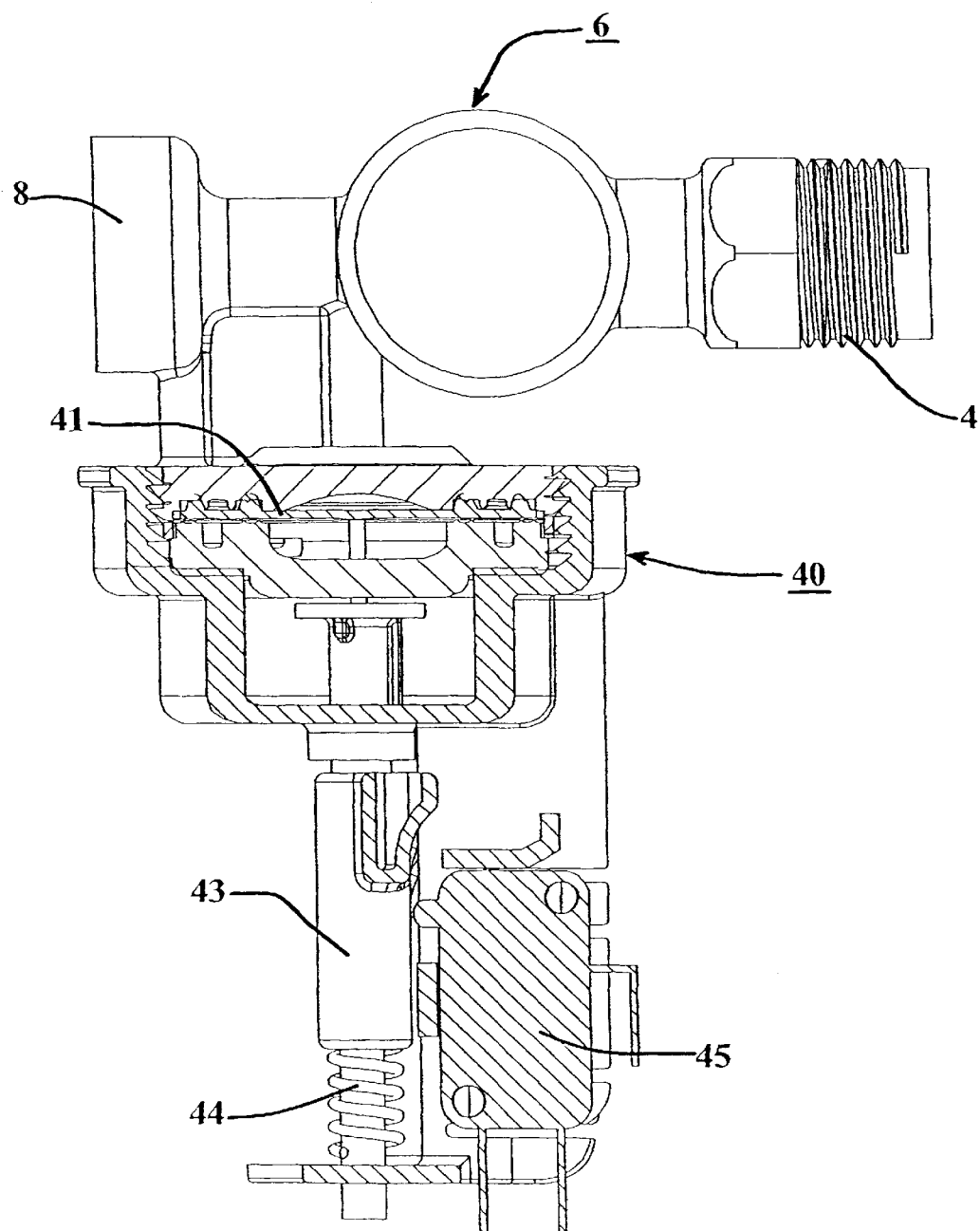

The Embodiment of FIGS. 6 and 6a–6b

FIGS. 6, 6a and 6b illustrate apparatus similar to that of FIGS. 4, 4a and 4b except that the manual control valve 6 is omitted. Such an arrangement could be used, for example, where a manual control valve is provided in the water supply pipe itself (not shown) to control the water rate to the electrical heater. In all other respects, the apparatus illustrated in FIGS. 6, 6a and 6b is constructed and operates in the same manner as described above with respect to FIGS. 4, 4a and 4b, and therefore the corresponding parts have been correspondingly numbered to facilitate understanding.

Figure 7:
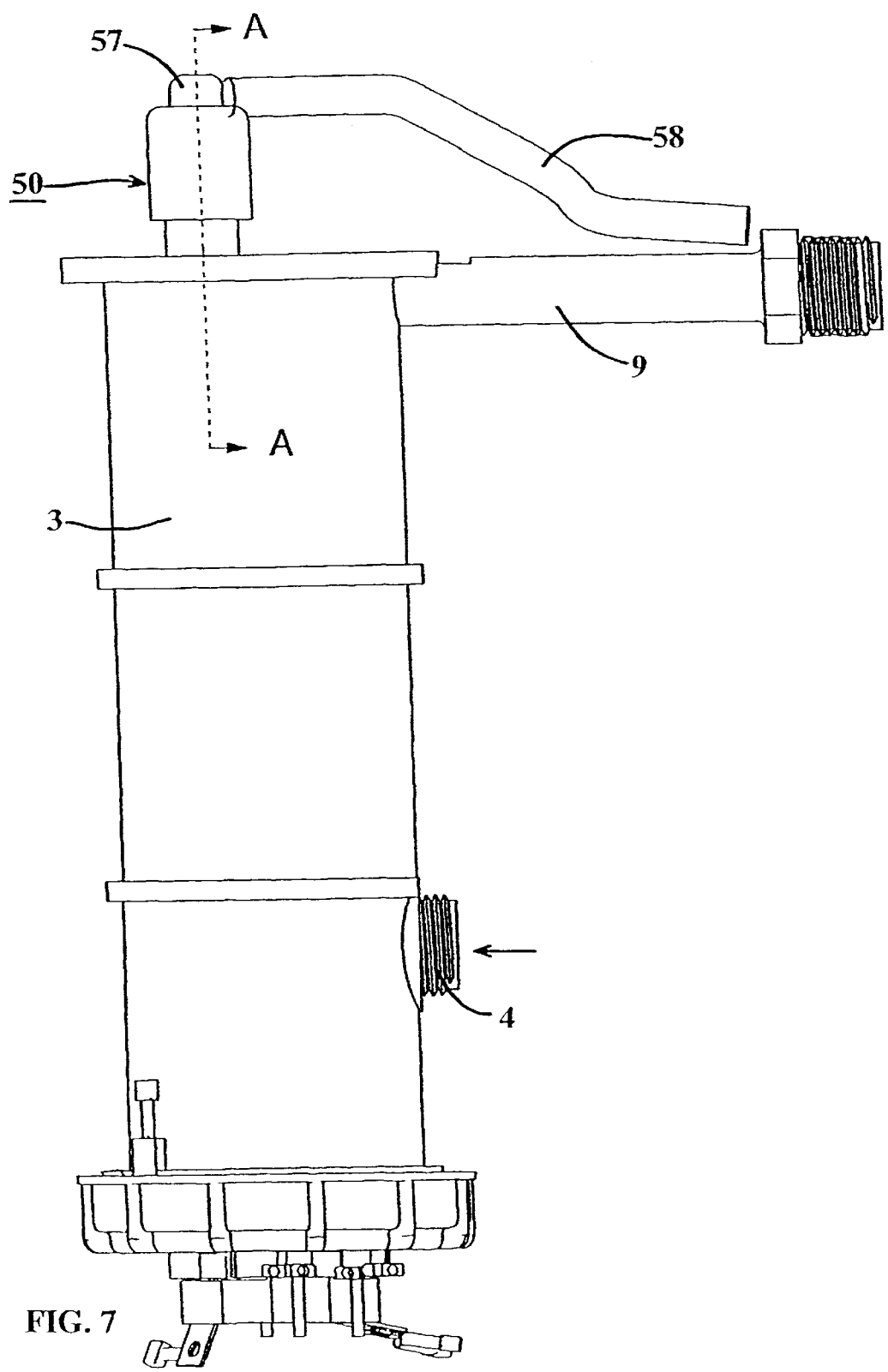
FIG. 7 illustrates a still further embodiment of the invention including a pressure release valve.
Figure 7A:
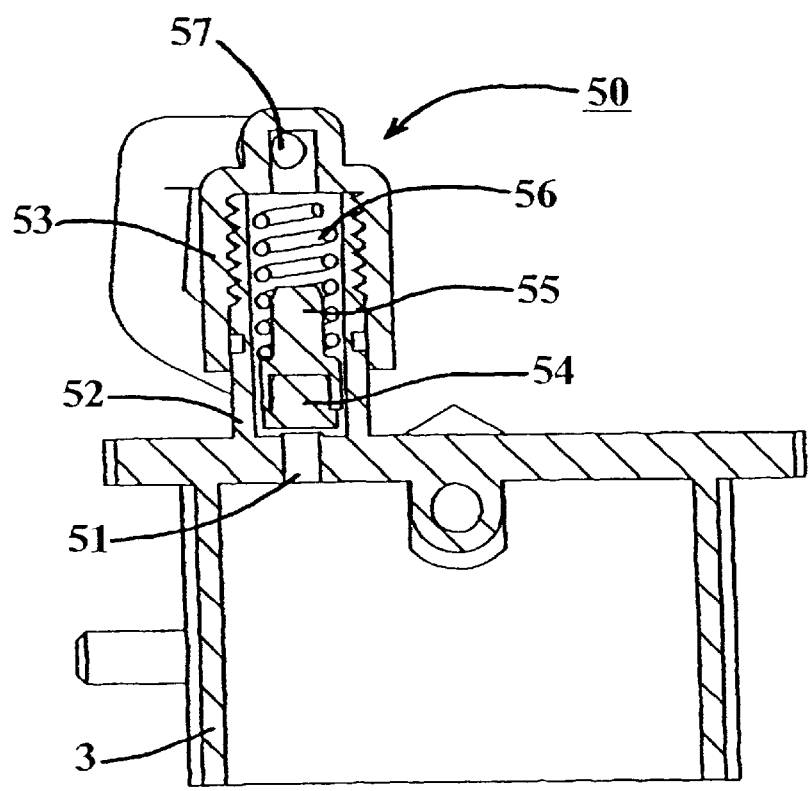
FIG. 7a illustrates the construction of the pressure release valve in FIG. 7.

The Embodiment of FIGS. 7 and 7a

FIGS. 7 and 7a illustrate an embodiment of the invention wherein the electrical heater 3 includes a pressure release valve, generally designated 50, adjacent to the hot water outlet 9. As shown in FIG. 7a, the pressure release valve 50 communicates with an opening 51 in the electrical heater 3, and includes a housing constituted of a first section 52 integrally formed with the heater, and a second section 53 threadedly closing section 52. A valve member 54 is provided within the housing and is urged to close opening 51 by a stem 55 and a spring 56. So long as the pressure within the electrical heater 3 is below a predetermined maximum, as preset by spring 56, valve member 54 closes opening 51, but whenever that pressure is exceeded the valve member is displaced to relieve the high pressure to the atmosphere via outlet 57 from the housing and tube 58 venting the pressure to the atmosphere.

While the invention has been described with respect to several preferred embodiments, it will be appreciated that these are set forth merely for purposes of example, and that many variations may be made. For example, the pressure-responsive device, and/or the control valve if included, could be provided at the outlet conduit 9, and integrally formed with that conduit, rather than at the inlet conduit 4. In addition, the regulated valve of FIG. 3 could be used in other applications. Many other variations, modifications and applications of the invention will be apparent.

What is claimed is:

1. Electrical heating apparatus for automatically heating water passing therethrough from a cold water supply pipe to a hot water delivery pipe, comprising:

a water heater housing including an electrical heater therein, an inlet coupling, and an outlet coupling;

an electrical control device controlling said electrical heater;

an inlet conduit connectable between the water supply pipe and the inlet coupling of the electrical heater housing for inletting cold water;

an outlet conduit connectable between the outlet coupling of the water heater housing and the water delivery pipe for outletting hot water thereto;

and a pressure-responsive device cooperable with said electrical control device to control the electrical heater;

characterized in that said pressure-responsive device is connected to one of said conduits in parallel to said electrical heater housing, and in that said pressure-responsive device includes an inlet integrally formed with said one conduit and the respective coupling of the water heater housing.

2. The apparatus according to claim 1, wherein said one conduit integrally formed with said pressure-responsive inlet is the inlet conduit connectable between the water supply pipe and the inlet coupling of the electrical heater housing for inletting cold water to the electrical heater.

3. The apparatus according to claim 2, wherein said inlet conduit is also integrally formed with said inlet coupling.

4. The apparatus according to claim 1, wherein the apparatus further comprises:

a control valve for controlling the water flow through said electrical heater; said control valve including a housing having an inlet also integrally formed with said one conduit and with at least part of said control valve housing.

5. The apparatus according to claim 4, wherein said control valve is a manually presettable valve.

6. The apparatus according to claim 5, wherein said manually presettable valve is a ball valve having a ball rotatable within the control valve housing and formed with a groove selectively positionable within a passageway for controlling the water flow therethrough and through the electrical heater.

7. The apparatus according to claim 4, wherein said control valve is a regulator valve automatically regulating the water flow therethrough to have a relatively constant flow rate despite variations in the water inlet pressure.

8. The apparatus according to claim 7, wherein said regulator valve comprises a membrane deformable in a flow control passageway in response to water flow through said passageway to maintain a relatively constant flow rate therethrough despite variations in the water inlet pressure.

9. The apparatus according to claim 8, wherein said regulator valve includes a stem having a head of convex configuration facing said membrane but normally spaced therefrom to define said flow control passageway; the convex configuration of said stem head producing, with said membrane, different cross-sectional areas and thereby different flow rates in said control passageway, creating differential pressures acting on said membrane tending to deform the membrane such as to maintain a relatively constant flow rate through the flow control passageway despite variations in water inlet pressure.

10. The apparatus according to claim 9, wherein said stem head is presettable with respect to said membrane to preset the flow rate.

11. The apparatus according to claim 10, wherein said stem head is threadedly received on said stem such that rotation of the stem in one direction moves the stem head towards the membrane, and rotation of the stem in the opposite direction moves the stem head away from the membrane.

12. The apparatus according to claim 1, wherein said pressure-responsive device senses the pressure at the inlet of its housing to control the energization of the electrical heater.

13. The apparatus according to claim 1, wherein said pressure-responsive device senses the flow rate to or through the electrical heater to control the energization of said electrical heater in response to the sensed flow rate.

14. The apparatus according to claim 13, wherein said pressure-responsive device senses the flow rate to or through the electrical heater by sensing the differential pressure at two locations in the flow path, one downstream of the other.

15. The apparatus according to claim 14, wherein the two locations in said flow path have different cross-sectional areas.

16. The apparatus according to claim 14, wherein said pressure-responsive device includes a displaceable member which is displaceable according to said sensed differential pressure and operates said electrical control device which controls said electrical heater.

17. The apparatus according to claim 13, wherein said electrical control device includes a plurality of electrical switches controlled by said displaceable member of the pressure-responsive device, and said displaceable member of the pressure-responsive device sequentially actuates the electrical switches according to the magnitude of displacement of said latter displaceable member to control the magnitude of the electrical heat produced by the electrical heater according to the water flow rate.

18. The apparatus according to claim 17, wherein said displaceable member of the pressure-responsive device includes a spring-urged membrane, and a stem coupled to said membrane and sequentially engageable with said switches to control the magnitude of the electrical heat according to the water flow rate.

19. The apparatus according to claim 1, wherein said electrical heater includes a pressure release valve for relieving an excessively high pressure within the electrical heater to the atmosphere.

20. Electrical heating apparatus for automatically heating water passing therethrough from a cold water supply pipe to a hot water delivery pipe, comprising:
a housing including an electrical heater therein;
an electrical control device controlling said electrical heater;
an inlet conduit connectable between the water supply pipe and the electrical heater for inletting cold water to the electrical heater;
a heater coupling communicating with said inlet conduit for inletting water therefrom into said electrical heater;
an outlet conduit connectable between the electrical heater and the water delivery pipe for outletting hot water thereto from the electrical heater;
and a pressure-responsive device cooperable with said electrical control device to control the electrical heater and having an inlet communicating with said inlet conduit and heater coupling;
characterized in that said pressure-responsive device senses the flow rate to or through the electrical heater to control the energization of said electrical heater in response to the sensed flow rate.

21. The apparatus according to claim 20, wherein said pressure-responsive device senses the flow rate to or through the electrical heater by sensing the differential pressure at two locations in the flow path, one downstream of the other.

22. The apparatus according to claim 21, wherein the two locations in said flow path have different cross-sectional areas.

23. The apparatus according to claim 20, wherein said pressure-responsive device includes a displaceable member which is displaceable according to said sensed differential pressure and operates said electrical control device which controls said electrical heater.

24. The apparatus according to claim 20, wherein said electrical control device includes a plurality of electrical switches controlled by said displaceable member of the pressure-responsive device, and said displaceable member of the pressure-responsive device sequentially actuates the electrical switches according to the magnitude of displacement of said latter displaceable member to control the magnitude of the electrical heat produced by the electrical heater according to the water flow rate.

25. The apparatus according to claim 24, wherein said displaceable member of the pressure-responsive device includes a spring-urged membrane, and a stem coupled to said membrane and sequentially engageable with said switches to control the magnitude of the electrical heat according to the water flow rate.

26. The apparatus according to claim 20, wherein said electrical heater includes a pressure release valve for relieving an excessively high pressure within the electrical heater to the atmosphere.

27. A regulating valve, comprising:
a housing;
a membrane within said housing;
and a stem within said housing having a head of convex configuration facing said membrane but normally spaced therefrom to define a flow-control passageway; the convex configuration of said stem head producing, with said membrane, different cross-sectional areas and thereby different flow rates in said control passageway, creating differential pressures acting on said membrane tending to deform the membrane such as to maintain a relatively constant flow rate through the flow control passageway despite variations in water inlet pressure.

28. The valve according to claim 27, wherein said stem head is presettable with respect to said membrane to preset the flow rate.

29. The valve according to claim 28, wherein said stem head is threadedly received on said stem such that rotation of the stem in one direction moves the stem head towards the membrane, and rotation of the stem in the opposite direction moves the stem head away from the membrane.

* * * * *